United States Patent
Feja et al.

[15] 3,642,451
[45] Feb. 15, 1972

[54] APPARATUS FOR THE DISSOLUTION OF RUBBER

[72] Inventors: Josef Heinz Feja, Recklinghausen; Karl-Heinz Landskroner, Marl, both of Germany

[73] Assignee: Chemische Werke Huls Aktiengesellschaft, Marl, Germany

[22] Filed: Nov. 19, 1968

[21] Appl. No.: 776,977

[30] Foreign Application Priority Data

Nov. 30, 1967 Germany...............................C 43994

[52] U.S. Cl....................................23/267, 23/308, 23/280, 222/58, 222/61, 222/555, 260/2.3
[51] Int. Cl. ....................................B01d 11/02, B01d 11/04
[58] Field of Search....................23/267, 271, 272, 309, 312, 23/272.6, 308, 259, 280; 222/58, 61, 555

[56] References Cited

UNITED STATES PATENTS

| | | | |
|---|---|---|---|
| 2,206,237 | 7/1940 | Roberts | 23/267 X |
| 2,336,882 | 12/1943 | Nyden | 222/555 |
| 2,387,488 | 10/1945 | Acken | 23/312 X |
| 2,614,574 | 10/1952 | Farrell | 23/267 X |
| 2,885,432 | 5/1959 | Broich | 23/267 X |
| 3,099,368 | 7/1963 | Turner | 222/58 |
| 3,276,629 | 10/1966 | Bylsma | 222/555 X |
| 3,319,828 | 5/1967 | Maxwell | 222/58 X |
| 3,322,507 | 5/1967 | Smith | 23/267 |
| 3,329,311 | 7/1967 | Goff | 222/58 X |
| 3,359,073 | 12/1967 | Scanley | 23/267 X |
| 3,486,863 | 12/1969 | Steuler | 23/267 X |
| 1,043,276 | 11/1912 | Volck | 23/272 |
| 2,149,373 | 3/1939 | Vincent | 23/308 |

Primary Examiner—Norman Yudkoff
Assistant Examiner—S. J. Emery
Attorney—Craig, Antonelli & Hill

[57] ABSTRACT

The present disclosure is directed to an apparatus for the dissolution of materials, for example rubber, which comprises a feeding tank provided with a heat exchange means, said feeding tank containing an inlet means for introducing the material to be treated thereto, and a dissolving vessel disposed below the feeding tank and provided with an inlet means for introducing a solvent thereto, said feeding tank and dissolving vessel being interconnected by a connecting means which is provided with at least one opening which partially interrupts the flow from the feeding tank to the dissolving vessel. The feeding tank can be provided with a means for introducing a pressurized fluid thereto and the entire system can be automatized by providing a transmitter means for synchronizing all of the elements of the apparatus.

1 Claims, 5 Drawing Figures

INVENTORS
JOSEF HEINZ FEJA
KARL-HEINZ LANDSKRÖNER

BY

*Craig & Antonelli*

ATTORNEYS

PATENTED FEB 15 1972 3,642,451

INVENTORS
JOSEF HEINZ FEJA
BY KARL-HEINZ LANDSKRÖNER

Craig & Antonelli
ATTORNEYS 3,642,451

APPARATUS FOR THE DISSOLUTION OF RUBBER

BACKGROUND OF THE INVENTION

The present invention is directed to an apparatus for the dissolution of materials, for example rubber. More particularly, the present invention is concerned with an automatic means for comminuting and dissolving rubber-type materials in an efficient and economical manner.

Rubber which is to be used for further processing is generally provided in square bales weighing about 25 kg. each. In order to accomplish the dissolution of a required amount of rubber as quickly as possible, the thus-supplied bale must be comminuted so that as large a surface area as possible can be exposed to contact with the solvent material which is used for dissolving the rubber during the process. If rubber bales of nonflowing rubber are utilized, they can be fed by hand, semiautomatically or automatically to the comminuting devices, such as, for example, cutting mills (impeller breakers), choppers or screw presses (extruders), and the like, from where the comminuted rubber is fed into a dissolving vessel.

However, difficulties have been encountered using this conventional process if the rubber bale which is freed from its wrapping tends to exhibit a so-called cold flow property, that is, if it does not retain its square shape but rather starts to flow on its support within a short period of time and then adheres to this support. In using these rubber types, the semiautomatic or automatic feeding to the customary comminuting devices is substantially impossible. On the other hand, these comminuting devices themselves often cannot also process such rubber types when the rubber is very viscous or is highly resilient upon being subjected to sudden stresses.

Rubber types are known which tend to exhibit cold flow properties and are also highly resilient upon sudden stress, but which impart to the final product to be manufactured the desired mechanical and chemical properties. Because these rubbers are so difficult to process, that is because they cannot be comminuted and dissolved in an economical manner, they cannot be employed because the expense involved is prohibitive.

SUMMARY OF THE INVENTION

An object of the present invention is to avoid the prior art disadvantages in the dissolution of rubber-type materials.

Another object of the present invention is to provide an improved apparatus for the dissolution of rubber-type materials which is automatic and can be accomplished in an economical manner.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved apparatus for the dissolution of rubber or rubberlike materials may be obtained by disposing a feeding tank (pressure tank) to which rubber bales can be added above a dissolving vessel which is provided with an inlet means for the introduction of a solvent thereto. The feeding tank and dissolving vessel are interconnected by a connecting means which is provided with at least one opening which partially interrupts the flow from the feeding tank to the dissolving vessel. The opening can be in the form of one or more narrow slots or a plurality of small perforations.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figures 1, 2:
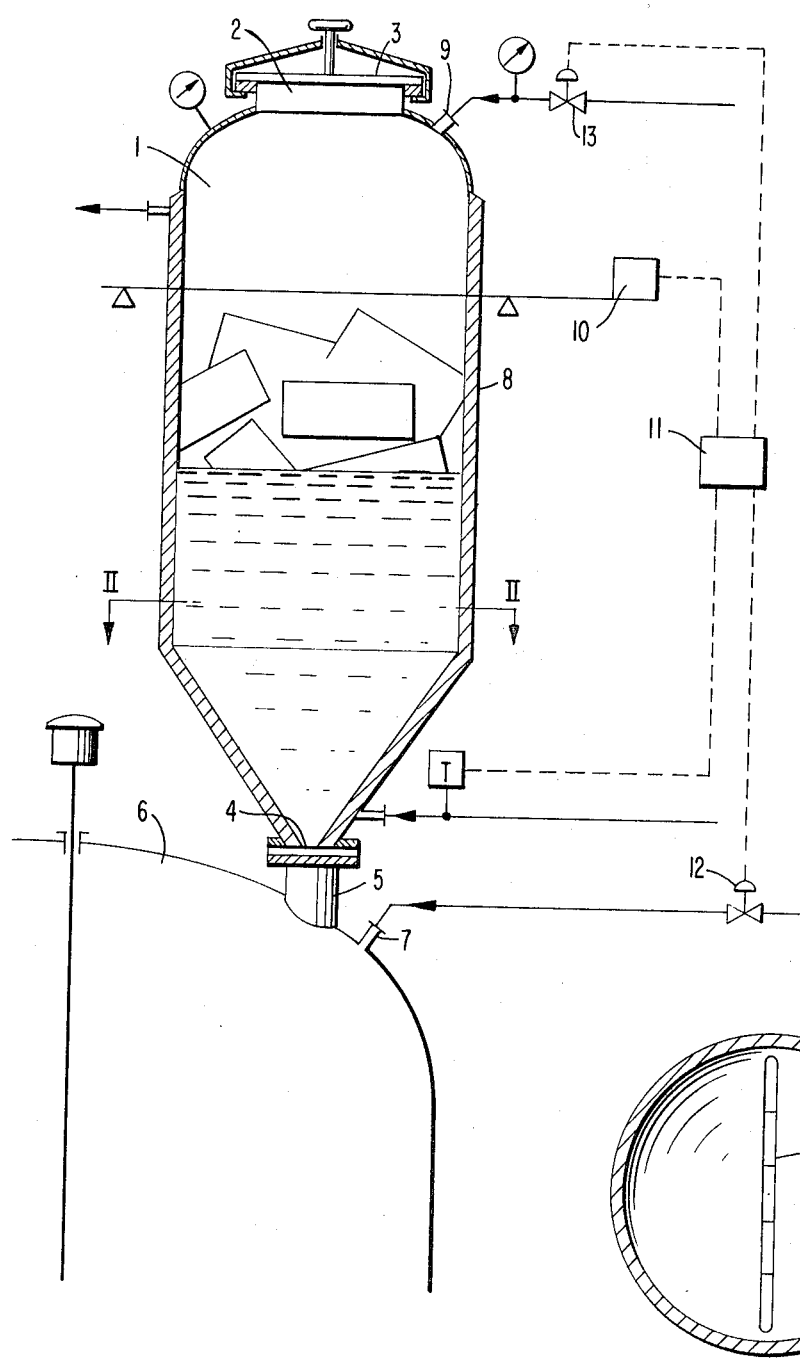
FIG. 1 illustrates a vertical sectional view of the apparatus of the present invention.
FIG. 2 is a section taken along line II—II of FIG. 1.

Referring now to the drawings wherein like reference numerals are used throughout the various views to designate like parts, the apparatus of the present invention comprises a feeding tank 1 provided with a relatively large charge opening 2 sealed by a lid 3. The feeding tank can be tapered in the downward direction in its lower portion toward the passage opening 4 which, as can be seen in the embodiment of FIG. 2, is shown as a long, narrow slot. By using appropriately disposed flanges and a connecting feedpipe 5, the feeding tank 1 is positioned on the dissolving vessel 6. A solvent can be introduced into the dissolving vessel through a feedpipe 7. The feeding tank 1 is provided with a heating jacket 8 which substantially surrounds the feeding tank 1 and accordingly can be used to influence the flow behavior or characteristics of the particular rubber-type material being processed. In addition, the feeding tank 1 can be provided with a feedpipe 9 for the introduction of a pressurized gas thereto. The pressurized gas is used to force an increase in the throughflow of the rubber material from the feeding tank into the dissolving vessel. Thus the pressurized gas can be optionally used in conjunction with increased heating of the rubber material utilizing the heating jacket 8.

The feeding tank 1 has such a large capacity that it is only necessary to fill said tank with rubber bales only one time per day or one time per shift. Due to the flow characteristics of the rubber or rubberlike material as a result of being heated by the heating jacket 8, the bale shape is quickly lost so that the rubber fills the lower space of the feeding tank 1 similarly as a viscous paste and finally passes into the dissolving vessel 6 through the charging openings 4.

As can be readily seen in the embodiment of FIG. 1, the apparatus of the present invention can be automatized to produce an effective and economical process. The amount of rubber passing into the dissolving vessel 6 can be determined, in this construction, by scales or pressure pickups 10. Although the pressure pickups 10 are used also for measuring the quantity of rubber filled into the container 1, these scales or pressure pickups serve primarily for determining the quantity of rubber passing from the container 1 into the dissolving vessel 6. The quantity of rubber determined in this manner, that is by measuring the difference in the rubber which passes from tank 1 into the dissolving vessel 6 controls the temperature of the rubber in the tank 1 by controlling the amount and temperature of the heating medium passing through the heating jacket 8, the pressure or the addition of compressed gas to tank 1, and the amount of solvent introduced into the dissolving vessel 6 by way of the feedpipe 7.

In order to regulate these three magnitudes, the transmitter 11 is employed. If too little rubber passes from the tank 1 into the dissolving vessel 6, the pressure and/or the temperature in tank 1 is increased utilizing the regulating device 11, and optionally, the feed of solvent to the dissolving vessel 6 is simultaneously reduced. Conversely, if too much rubber passes from the tank 1 into the dissolving vessel 6, the pressure and/or the temperature in the tank 1 is reduced, and the feed of solvent into the dissolving vessel 6 is increased.

The scale or pressure pickup 10 constitutes a customary device which is well known in the art. Basically, all conventional weighing devices are suitable for this purpose. In this case, the connecting means between the feeding tank 1 and the dissolving vessel 6 should be constructed so as to be elastic in the vertical direction. The pipelines should also be flexibly connected. The connection between the tank 1 and the dissolving vessel 6 must be made elastic because otherwise the function of the scales 10 would be disturbed. Moreover, dimensional fluctuations would have an unfavorable effect as a result of temperature variations in tank 1. There are various, generally well known ways for connecting pipelines in a flexible manner. If pressure pickups are employed as scales, only minor positional differences occur with respect to the containers, so that it is sufficient to support the pipelines at a larger distance from the feed pipe, for example, about 1 to 2 meters therefrom. If beam or lever scales are utilized, wherein, of course, larger positional variations of the containers occur, due to the larger lever path, it is possible to utilize for the pipelines corrugated pipes of metal or a suitable synthetic material, or hoses of a suitable synthetic material. If synthetic corrugated pipes or hoses are employed, Teflon is a preferred material.

With the aid of the transmitter 11, the feeding of the solvent into the dissolving vessel 6 by way of the feedpipe 7 is controlled by the regulating element or valve means 12 in synchronization with the amount of rubber passing into the dissolving vessel 6. Furthermore, the amount of rubber entering the dissolving vessel 6 per unit of time is controlled by the amount of compressed gas introduced into the feeding tank 1 via the feedpipe 9 with the aid of the regulating element or valve means 13. The amount of rubber entering the dissolving vessel 6 can also be controlled by the heating jacket 8 which is also controlled by the transmitter 11. In addition, the total cross-sectional area of the passage openings 4 can be readily made to be adjustable, thereby providing an additional regulating means.

There are various ways of making the cross section of the passage openings 4 adjustable. It is possible, for example, to provide the slot illustrated in FIG. 2 with one or several diaphragms, so that the length or the width of the slot can be varied. It is likewise possible to provide, at the lower end of the tank 1, two perforated or slotted plates which are disposed one on top of the other so that they can be rotated with respect to each other. Thus the free cross section can be varied by rotating one of the perforated or slotted plates, in the case where the other plate is fixed, or by rotating both plates with respect to each other.

Figure 3:
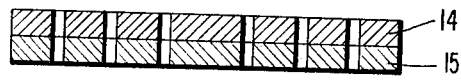
FIG. 3 shows two slotted plates disposed one on top of the other.
Figure 4:
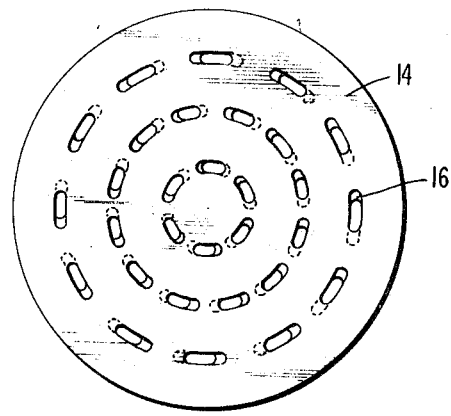
FIG. 4 shows a top view of FIG. 3 when the plates are partially rotated with respect to each other.
Figure 5:
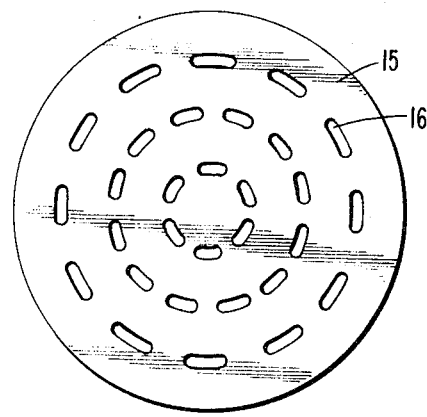
FIG. 5 shows a top view of a single slotted plate.

In FIGS. 3, 4 and 5, such an arrangement is illustrated schematically. Two plates 14 and 15, provided with slots 16 are disposed one on top of the other. FIG. 3 shows a section through such an arrangement. FIG. 4 shows a top view when the plates are partially rotated with respect to each other, so that only a part of the cross section remains free. FIG. 5 shows a top view of a single slotted plate. By using the novel apparatus of the present invention, it is now possible to comminute and dissolve rubber which heretofore could not be processed economically.

The novel apparatus of the present invention is not to be limited in its utilization only to the above-described types of rubber which, because of the property of high cold flow are inherently difficult to process, but rather this apparatus is also effective in the dissolution of other types of rubber. This is possible because many types of rubber begin to flow upon moderate heating. In this connection, the higher viscosity rubbers must, in certain cases, be compensated for by a higher pressure in the gas-filled chamber. The novel apparatus of the present invention does not require any moving components for its proper functioning and accordingly, any problems normally associated with such moving components are eliminated and servicing operations need no longer be conducted.

It is claimed:

1. Apparatus for the dissolution of rubber which comprises a pressurizable feeding tank having a tapered bottom section and surrounded by a heating jacket, a sealable inlet means in the top of said feeding tank for introducing rubber thereto, valved inlet means in the upper portion of said feeding tank for introducing a pressurizing gas thereto to aid discharge of melted rubber, an outlet for melted rubber in the bottom of said feeding tank, a closed dissolving vessel disposed below the feeding tank and provided with an inlet means in the top portion thereof for introducing melted rubber thereto and a valved inlet means for introducing solvent thereto, the outlet of said feeding tank and the melted-rubber inlet means of said dissolving vessel being interconnected by a connecting means which is flexible in the vertical direction, said connecting means being provided with a first perforated plate fixedly mounted to the outlet of the feeding tank and a second perforated plate disposed therebeneath in contact with said first plate and containing the same perforations as the first plate, said second plate being movable with respect to the first plate, scale means operatively connected to said feeding tank for determining the amount of rubber passing into said dissolving tank, pressure sensing means connected with said feeding tank, temperature-sensing means connected with said heating jacket, regulator, transmitter means for receiving said weight, pressure and temperature measurements and automatically controlling the valve in said gas inlet means, the flow of heat exchange fluid through said heating jacket, and the valve in said solvent inlet means.

* * * * *